(12) United States Patent
Puuskari (10) Patent No.: US 7,649,837 B1
(45) Date of Patent: Jan. 19, 2010

(54) CONTROL OF GATEWAY SUPPORT NODE SELECTION

(75) Inventor: Mikko Puuskari, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/869,247

(22) PCT Filed: Dec. 28, 1999

(86) PCT No.: PCT/FI99/01083

§ 371 (c)(1),
(2), (4) Date: Sep. 14, 2001

(87) PCT Pub. No.: WO00/41414

PCT Pub. Date: Jul. 13, 2000

(30) Foreign Application Priority Data

Dec. 31, 1998 (FI) ........................................ 982855

(51) Int. Cl.
*H04L 12/26* (2006.01)
(52) U.S. Cl. .................. 370/225; 370/252; 370/331; 370/401
(58) Field of Classification Search ................. 370/328, 370/338, 401, 216–218, 229, 230, 235, 237, 370/252, 310, 349, 402, 225, 262
See application file for complete search history.

(56) References Cited

U.S. PATENT DOCUMENTS

| 5,752,162 A | | 5/1998 | Sawyer et al. | |
|---|---|---|---|---|
| 5,892,819 A | * | 4/1999 | Stumer | 379/211.02 |
| 6,070,192 A | * | 5/2000 | Holt et al. | 709/227 |
| 6,104,929 A | * | 8/2000 | Josse et al. | 455/445 |
| 6,233,458 B1 | * | 5/2001 | Haumont et al. | 455/445 |
| 6,535,507 B1 | * | 3/2003 | Li et al. | 370/356 |
| 6,608,832 B2 | * | 8/2003 | Forslow | 370/353 |
| 6,636,502 B1 | * | 10/2003 | Lager et al. | 370/352 |
| 6,738,909 B1 | * | 5/2004 | Cheng et al. | 726/3 |
| 6,829,242 B2 | * | 12/2004 | Davison et al. | 370/401 |
| 6,937,566 B1 | * | 8/2005 | Forslow | 370/231 |
| 2001/0055299 A1 | * | 12/2001 | Kelly | 370/352 |
| 2003/0026273 A1 | * | 2/2003 | Davison et al. | 370/409 |
| 2007/0091862 A1 | * | 4/2007 | Ioannidis | 370/338 |
| 2007/0195791 A1 | * | 8/2007 | Bosch et al. | 370/395.52 |
| 2007/0213058 A1 | * | 9/2007 | Shaheen | 455/436 |

FOREIGN PATENT DOCUMENTS

| WO | WO 98/59468 | 12/1998 |
|---|---|---|
| WO | WO 00/14981 | 3/2000 |

* cited by examiner

*Primary Examiner*—Chi H. Pham
*Assistant Examiner*—Shick Hom
(74) *Attorney, Agent, or Firm*—Pillsbury Winthrop Shaw Pittman, LLP (57) ABSTRACT

The invention relates to controlling selection of a gateway support node of a packet-switched network. The invention includes defining at least one condition for the gateway support node. When the condition is fulfilled, another gateway support node is more suitable for transmitting packets. When fulfillment of the condition is detected, a first message indicating the other gateway support node is transmitted to the serving support node.

12 Claims, 4 Drawing Sheets

CONTROL OF GATEWAY SUPPORT NODE SELECTION

This application is the National Stage of International Application PCT/FI99/01083 filed Dec. 28, 1999 which designated the U.S. and that International Application was filed in English.

BACKGROUND OF THE INVENTION

The invention relates to controlling selection of a gateway support node in a packet-switched network, and particularly to controlling selection of a packet-switched gateway support node in a mobile communication network.

Mobile communication networks function as effective access networks which provide the users with access to the actual data networks for mobile data transmission. Mobile data transmission is supported particularly well by digital mobile communication systems, such as the pan-European mobile communication system GSM (Global System for Mobile Communication). In this application the term 'data' refers to any information transmitted in a digital telecommunications system. Such information may comprise digitally encoded audio and/or video, inter-computer data traffic, telefax data, short sections of program codes, etc.

General packet radio service GPRS is a new service for the GSM system and one of the issues standardized by ETSI (European Telecommunication Standard Institute) in GSM phase 2+. The GPRS service enables packet data transmission between mobile data terminals and external data networks, while the GSM network functions as an access network. One of the requirements set on the GPRS service is that it should cooperate with different external data networks, such as the Internet or X.25 networks. In other words, the GPRS service and the GSM network should be able to serve all users regardless of the type of the data network they want to attach to via the GPRS service. This means that the GPRS service must support and process different network addresses and data packet forms. Processing of data packets also comprises routing of them in a packet radio network. Furthermore, the users should be able to roam from the home GPRS network to a visiting GPRS network the operator of which may have a backbone network supporting a different protocol (e.g. CLNP) than the home network (e.g. X.25). The logical network architecture of the GPRS service is illustrated in FIG. 1.

Figure 1:
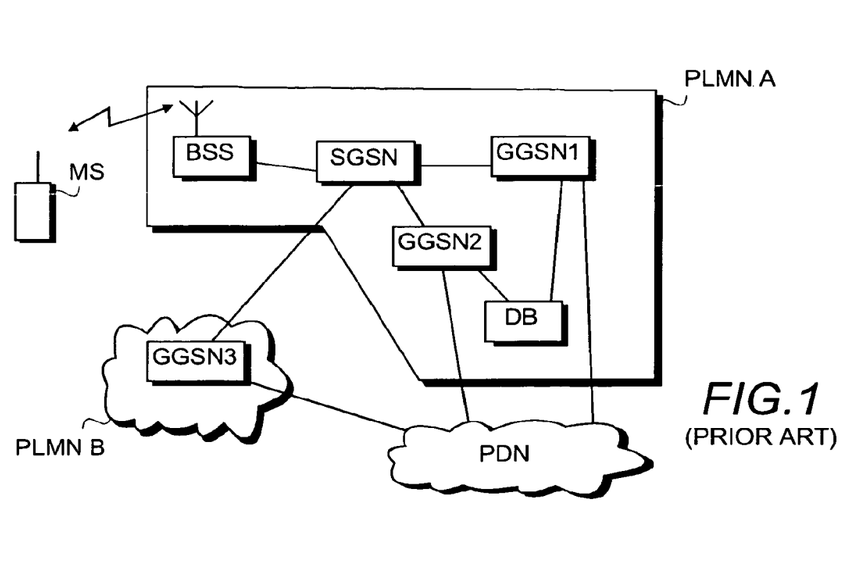
FIG. 1 illustrates the essential parts of the logical network architecture of a packet radio network.

FIG. 1 illustrates the network architecture of a GPRS service at a general level because the detailed structure of the network is irrelevant to the invention. The GPRS service comprises an access network which provides radio access and is the base station subsystem BSS of the GSM system in FIG. 1, and support nodes of the GPRS service for packet-switched transmission of packet-switched data between a packet network PDN and a mobile station MS. The support nodes include a serving GPRS support node SGSN and a gateway GPRS support node GGSN. These different support nodes SGSN and GGSN are interconnected by a backbone network. It should be noted that the functionalities of the SGSN and the GGSN can also be physically combined into the same network node. Logically the nodes are, however, separate nodes.

The serving GPRS support node SGSN serves the mobile station MS. Each support node SGSN manages a packet data service within the area of one or more cells in a cellular packet radio network. For this purpose, each support node SGSN is typically connected to a base station subsystem BSS. The mobile station MS in a cell communicates with a base station over the radio interface and further through the base station subsystem with the support node SGSN to the service area of which the cell belongs.

The gateway GPRS support node GGSN connects the GPRS service of an operator to other data networks PDN, such as an IP network (Internet, Intranet) or X.25 network. The GGSN includes the routing information on GPRS subscribers, i.e. SGSN addresses and addresses of the external network related to the PDP contexts. The GGSN functions as a router between the external address and the internal routing information (e.g. SGSN). The GGSN may also transmit packets from one mobile station to another within the network.

A subscriber to the GPRS service has one or more external PDP addresses available. The PDP address is used for identifying a certain user context from the external network. A mobile station attached to the GPRS service may receive and/or transmit data packets with a certain PDP address provided that a corresponding packet data protocol PDP context is activated in the mobile station, serving support node and gateway support node. Activation of the PDP context establishes a tunnel between the support node SGSN serving the mobile station and the gateway support node GGSN. The tunnel is established using a GPRS tunneling protocol GTP between the SGSN and the GGSN. The prior art tunneling protocol is disclosed in ETSI specification GSM 09.60, version 6.2.0 (Digital cellular telecommunications system (Phase 2+); General Packet Radio Service (GPRS); GPRS Tunneling Protocol (GTP) across the Gn and Gp Interface). The tunnel is established in such a manner that the SGSN sends a 'Create PDP Context' request to the GGSN which either accepts or rejects it. If the GGSN accepts the create request, the tunnel is established. If the GGSN rejects the create request, the SGSN either sends the create request to the next GGSN (if it has information on it) or informs the mobile station of the fact that the context cannot be activated. Selection of the next GGSN by the serving support node SGSN is based on static lists which are maintained e.g. in the internal name server of the GPRS service. After the tunnel has been established, the gateway support node GGSN can only either reject or accept any update requests made by the serving support node or request the serving support node to remove the tunnel.

A problem related to the arrangement described above is that the gateway support node GGSN cannot at any stage indicate another gateway support node to the serving support node which would be a more suitable gateway support node.

BRIEF DESCRIPTION OF THE INVENTION

An object of the invention is to provide a method and an apparatus implementing the method to eliminate the above-mentioned problems. The objects of the invention are achieved with a method, telecommunications system and support nodes of a packet network which are characterized by what is disclosed in the independent claims. The preferred embodiments of the invention are described in the dependent claims.

The invention is based on the idea that the gateway support node suggests another more suitable gateway support node with which the tunnel should be established to the serving support node. The gateway support node may make the suggestion either when it rejects the request for establishing a tunnel or when the conditions change so that it is practical to remove the existing tunnel.

An advantage of the method, system and support nodes of the invention is that the operator can distribute the load dynamically to the gateway support nodes in the network and transfer the tunnel between the SGSN and the gateway support node to another gateway support node depending on the conditions, e.g. in connection with handover of serving support nodes.

In a preferred embodiment of the invention the messages which are sent to the serving support node and indicate the most suitable gateway support node are response messages to the 'Create PDP Context' request. A further advantage of this embodiment is that it is extremely simple to implement: one parameter/attribute is added to an existing message. This enables gradual introduction of the feature into a network, and thus both old serving support nodes lacking the inventive functionality and new serving support nodes with the functionality of the invention can be used simultaneously in the network without interfering with its function.

In a preferred embodiment of the invention where the end of an existing tunnel is to be transferred from one gateway support node to another, the tunnel is removed in the gateway support node only in response to a positive acknowledgement. A further advantage of this embodiment is that packets are not lost if there has not been time to establish a tunnel between the other gateway support node and the serving support node. This embodiment also allows to ensure at least satisfactory transmission of packets.

BRIEF DESCRIPTION OF THE DRAWINGS

The invention will be described in greater detail by means of preferred embodiments with reference to the accompanying drawings, in which.

DETAILED DESCRIPTION OF THE INVENTION

The present invention is applicable to any packet-switched system which utilizes the tunneling technique between the gateway support node and the serving support node. These include the third-generation mobile communication systems, such as the Universal Mobile Telecommunications System (UMTS) and IMT-2000 (International Mobile Telecommunications 2000), mobile communication systems corresponding to the GSM system, such as the DCS 1800 (Digital Cellular System for 188 MHz) and PCS (Personal Communication System), and WLL systems which are based on the above-mentioned systems and implement a GPRS type packet radio. However, the invention has been described using the GPRS service of the GSM system as an example, but naturally the invention is not limited to such a system. The definitions of mobile communication systems change rapidly, which may necessitate additional changes to the invention. For this reason, all the terms and expressions should be interpreted broadly, and it should also be kept in mind that they are only intended to describe the invention, not to limit it.

The subnetwork BSS, network elements SGSN and GGSN and external packet data network PDN shown in FIG. 1 were described in greater detail above. The structure and function of the GSM system are very familiar to a person skilled in the art. The structure of the GPRS service, for example, is defined in ETSI specification 03.60, version 6.0.0 (Digital cellular telecommunications system (Phase 2+); General Packet Radio Service (GPRS); Service Description; Stage 2). The example shown in FIG. 1 illustrates the fact that the SGSN may communicate with the packet data network PDN via several gateway support nodes GGSN1, GGSN2, GGSN3. These gateway support nodes may also be located in different mobile communication networks PLMN A and PLMN B. One GGSN may similarly communicate with several serving support nodes SGSN, even though this is not illustrated in the figure.

In addition to the prior art functions, the support nodes SGSN and GGSN of the system according to the invention are arranged to perform the functions to be explained in connection with FIGS. 2 to 6. They comprise processors and memory which can be utilized in the functions of the invention. All changes needed to implement the invention can be carried out as additional or updated software routines.

In addition, the system may comprise means for storing recommendable gateway support nodes in the memory. The memory means are preferably located in a centralized database DB. The memory means or some of them may also be divided between the network elements, e.g. each gateway support node GGSN may have a list of its own. In the latter case the gateway support nodes GGSN may also need additional memory. The information in the database can be updated e.g. via network management (not shown). For example, the recommended gateway support nodes can be stored so that each gateway support node SGSN has a list of its own from which a suitable support node is selected according to the features and available resources. The way in which the lists are maintained or the grounds on which the selection is made is irrelevant to the invention. It is essential that the gateway support node receives, when needed, information on a better/more recommendable gateway support node. It may also receive this information directly from the operator, and thus the memory is not necessary.

Figure 2:
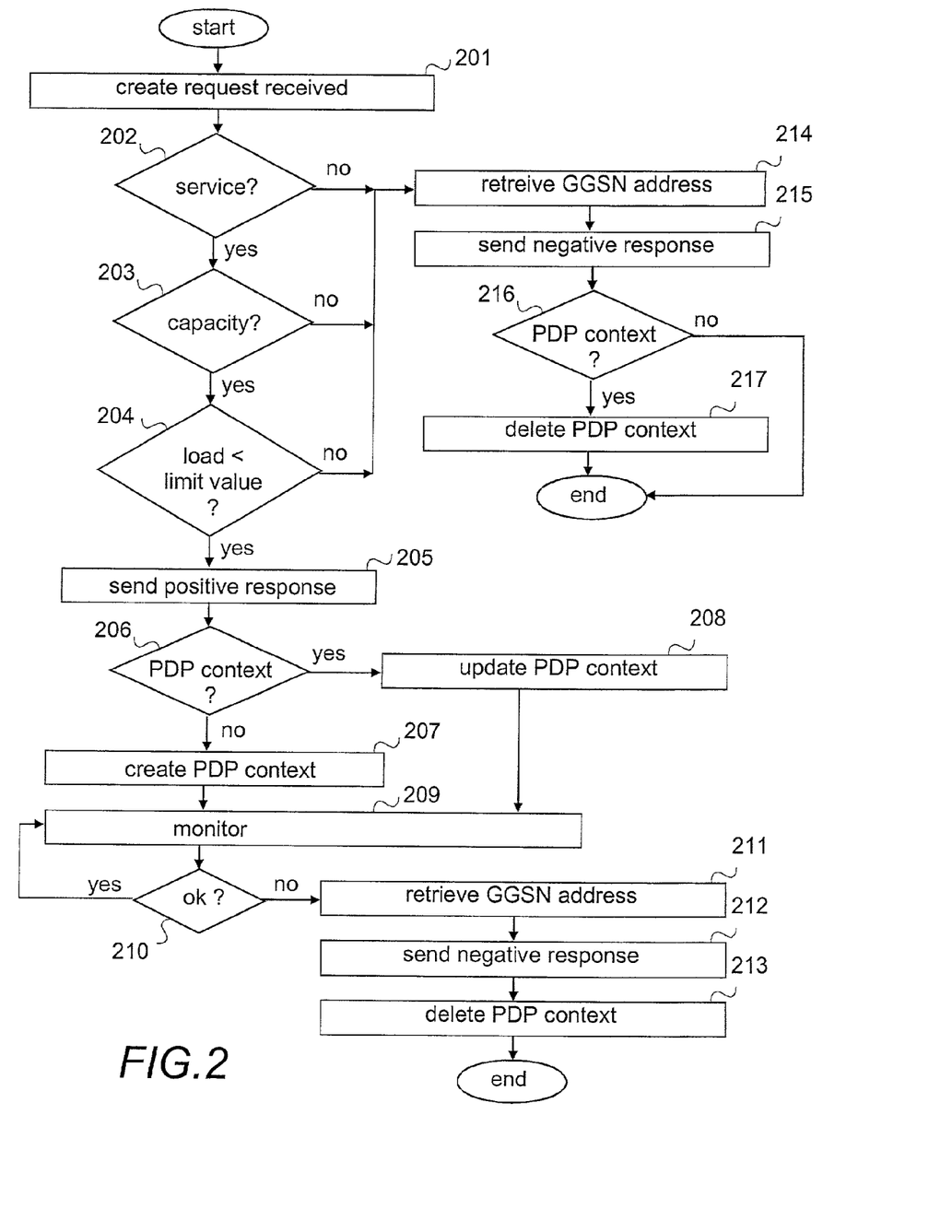
FIG. 2 is a flow chart illustrating the function of a first preferred embodiment according to the invention in a serving support node.

FIG. 2 is a flow chart illustrating the function of the gateway support node GGSN according to the first preferred embodiment of the invention in respect of one PDP context. In step 201 a 'Create PDP Context' request (or Create AA PDP Context request) is received from the serving support node. In step 202 it is checked whether the gateway support node supports the desired service, such as an IP-based connection or a connection to a certain company network. If the gateway support node supports the desired service, it is checked in step 203 whether the gateway support node can provide the necessary capacity, e.g. the desired quality of service. If the gateway support node is capable of offering the necessary capacity, it is checked in step 204 whether the load of the gateway support node is below the limit value set by the operator. The operator may set a fixed limit value or change it according to the load. For example, when there is a lot of traffic in the network, the limit value may be 95% of the maximum load, but if the amount of traffic is small, the limit value may be changed to 50% of the maximum load. If the load is smaller than the limit value, a positive response is sent to the serving support node in step 205 (Create PDP Context Response (request accepted) or Create AA PDP Context Response (request accepted)). Thereafter it is checked in step 206 whether the PDP context already exists. If there is no PDP context, it is created in step 207. If a PDP context exists, it is updated in step 208.

From steps 207 and 208 we move to step 209 where the situation of the gateway support node is monitored. During monitoring it is checked in step 210 whether the situation is OK. This is found out e.g. by comparing the load and the limit value. The limit value can be changed even though a tunnel would already exist to divide the load between the gateway support nodes. If the situation is OK, we continue monitoring. If the situation is not OK, e.g. the load situation changes and the operator wants to divide the load, the address of a more recommendable GGSN is retrieved in step 211. Thereafter in step 212 the serving support node is informed of the fact that the gateway support node has to be changed. The information to be sent includes the address of the recommended gateway support node. In the first preferred embodiment step 212 is performed by sending a negative response which includes information on the gateway support node recommended by the gateway support node (Create PDP Context Response (cause, GGSN2) or Create AA PDP Context Response (cause, GGSN2)). In other words, in the first preferred embodiment the GGSN may send the same message as when responding to the Create PDP Context request even when the PDP context is activated and the tunnel exists. In other embodiments another message may also be sent to transfer the end of the tunnel. Alternative messages include Delete PDP Context Request (GGSN2) and Reset PDP Context GGSN2. In the first preferred embodiment the PDP context is deleted in step 213 after the negative response has been sent.

If it is noted in step 202 that the requested service is not supported, we move to step 214 to retrieve the address of the more recommendable GGSN. Then a negative response including information on the gateway support node recommended by the gateway support node (Create PDP Context Response (cause, GGSN2) or Create AA PDP Context Response (cause GGSN2)) is sent in step 215. Thereafter it is checked in step 216 whether a PDP context already exists, and if there is a PDP context, it is deleted in step 217. In some other embodiments the PDP context is not necessarily deleted in step 217, but the PDP context is either retained or deleted, depending on the case and the purpose of use. The tunnel, however, is removed. The same can also be done in step 213.

If there is no capacity available, we move to step 214, from step 203. If the load is not below the limit value, we move to step 214 from step 204.

When the load is calculated, the level of quality of service, i.e. QoS level, wished for the context in question can also be taken into account. In that case the desired QoS parameter values sent in the request are checked and it is evaluated whether the desired quality of service can be reached/guaranteed in step 204. If the desired quality of service cannot be reached or guaranteed, it is possible to indicate a GGSN which could support the desired service better.

Steps 203, 204 and 205 exemplify some conditions which the operator may define to distribute the load or to use the gateway support nodes supporting different services. The conditions for rejecting creation of a context may differ from what has been described above. The conditions may also vary according to the load situation or be independent of the load situation. Furthermore, the conditions may be defined separately for each gateway support node or the conditions or some of them may be defined jointly e.g. in a database which includes the lists of the most recommendable gateway support nodes. The condition may be gateway support node-specific, such as a supported service, or common to all gateway support nodes of the same operator. A common condition could be e.g. that the tunnel of a visiting mobile station is established in the home network. For example, if the mobile station MS is a subscriber of the PLMN B network in the situation illustrated in FIG. 1, the condition defined for the GGSN1 or GGSN 2 (or for them in a database, for example) may be that the subscribers of the PLMN B are routed to the GGSN3. It is essential that at least one condition has been defined and the GGSN is given the address of another GGSN which it may include in the negative response.

In some other preferred embodiments of the invention transfer of the tunnel end to another gateway support node, i.e. steps 209, 210, 211, 212 and 213, can be omitted.

Figure 3:
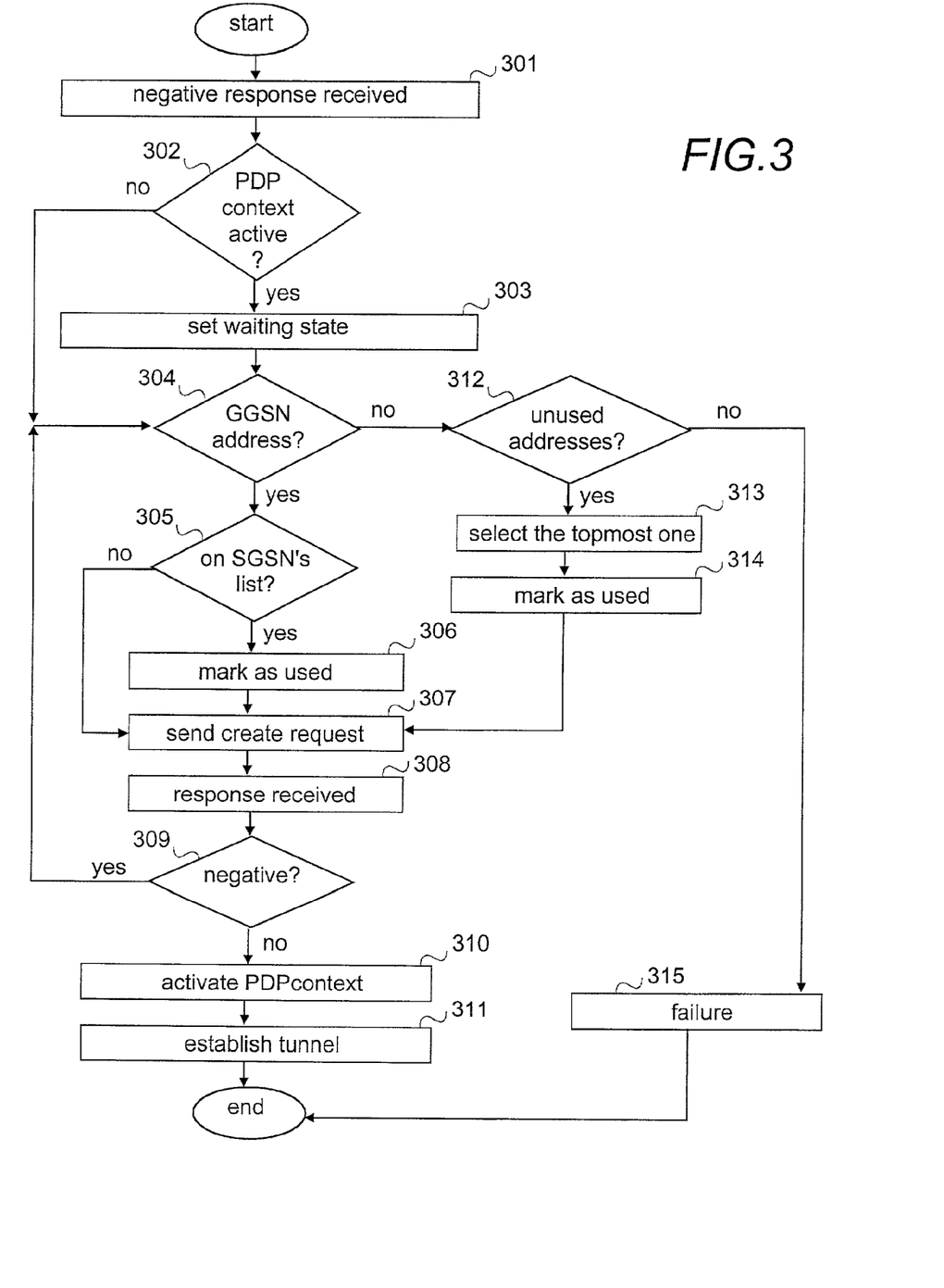
FIG. 3 is a flow chart illustrating the function of a second preferred embodiment according to the invention in a serving support node.

FIG. 3 is a flow chart illustrating the function of the serving support node SGSN according to the first preferred embodiment of the invention in respect of one PDP context. In step 301 a negative response to the 'Create PDP Context' request is received from the serving support node (Create PDP Context Response (cause) or Create AA PDP Context Response (cause)). In step 302 it is checked whether the corresponding PDP context is active. If it is, it is set to wait for a response in step 303 after which we move to step 304. If the PDP context is inactive, we move to step 304 straight from step 302. In step 304 it is checked whether the response included the address of the recommended gateway support node GGSN in addition to the cause. If it includes the address, it is checked in step 305 whether the same GGSN address is on the GGSN list of the SGSN. If it is listed, it is marked as used on the SGSN's own list in step 306, after which we move to step 307. By marking the node as used we ensure that two create requests are not sent to the same GGSN. If the SGSN's list does not include the GGSN address, we move straight to step 307 where a 'Create PDP Context' request is sent to the GGSN indicated in the negative response. In step 308 a response is received from the GGSN. In step 309 it is checked whether the response was negative. If it was negative, we move to step 304 to check whether the response included the GGSN address in addition to the cause. If the response was positive (Create PDP Context Request (request accepted) or Create AA PDP Context (request accepted)), a PDP context is activated in step 310 and a tunnel established between the serving support node SGS and the gateway support node GGSN in step 311.

If it is noted in step 304 that the negative response did not include the GGSN address, it is checked in step 312 whether there are unused GGSN addresses on the GGSN list of the serving support node. If this is the case, the address on the top of the list is chosen in step 313 and marked as used in step 314, after which we move to step 307 to send a 'Create PDP Context' request. When this route is used, the create request is always sent to the GGSN selected from the SGSN's own list. If it is noted in step 312 that there are no unused GGSN addresses on the list of the serving support node, a failure will occur (step 315) and packets cannot be transmitted.

In some other preferred embodiments of the invention steps 305, 306, 312, 313 and 314 are not performed at all. In that case the gateway support node is solely responsible for finding the alternative gateway support node.

The steps described in FIGS. 2 and 3 are not in absolute chronological order and some of the steps can be performed simultaneously or in a different order. These steps include steps 202, 203 and 294 and steps 314 and 307. Other functions may also be performed between the steps, e.g. in FIG. 2 data of the PDP context, such as the SGSN address, may be updated, or the PDP context may be deleted in response to a delete request sent by the SGSN. It is also possible to wait for an acknowledgement from the serving support node between steps 212 and 213 of FIG. 2 and delete the PDP context only in response to an acknowledgement which indicates that another tunnel has been established successfully. In the embodiments of the invention where the negative response is used only when the tunnel is established, another message, e.g. delete or reset, is sent in step 212. In that case at least steps 302 and 303 are omitted from the example of FIG. 3 when the negative response is received. When another message is received, these steps are performed.

Figure 4:
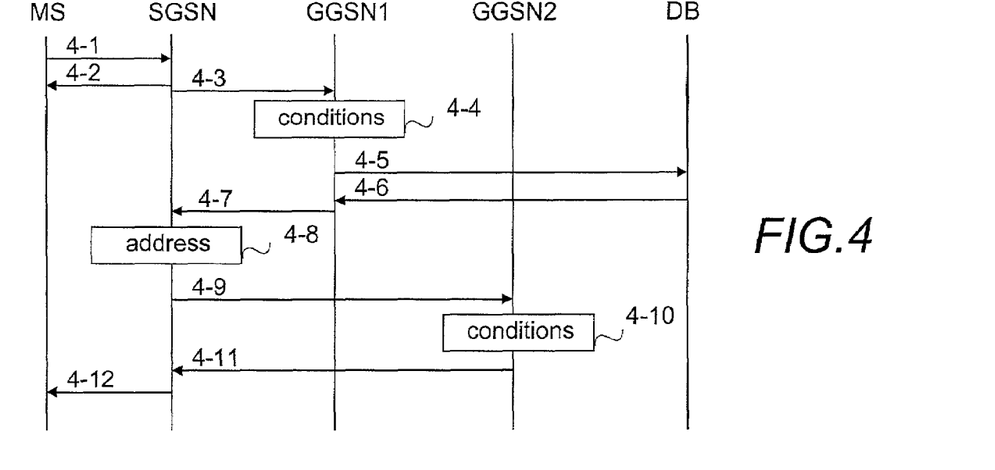
FIG. 4 is a signalling chart illustrating establishment of a tunnel according to the invention.
Figure 5:
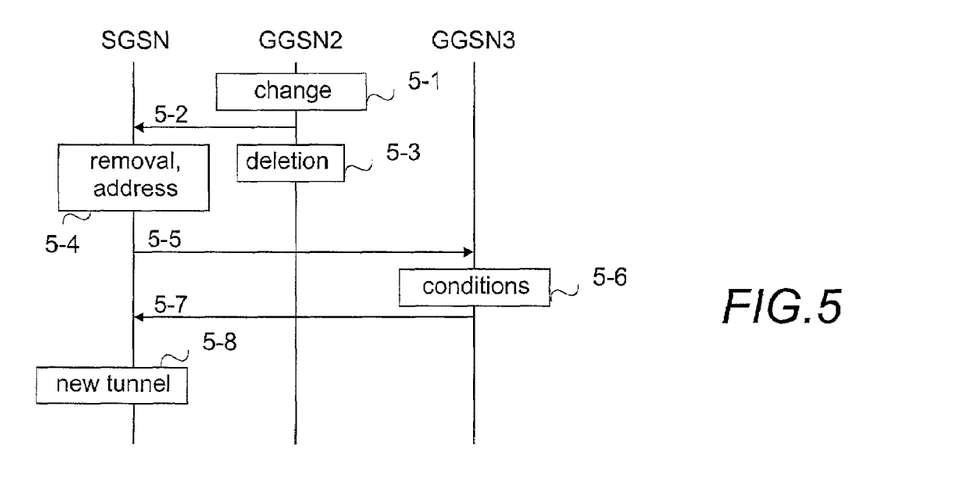
FIGS. 5 and 6 are signalling charts illustrating how one end of the tunnel is transferred from one gateway support node to another.
Figure 6:
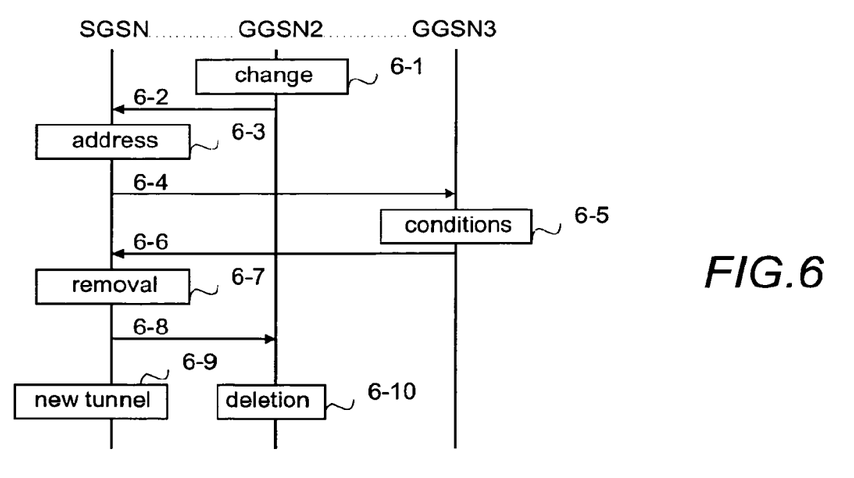

FIGS. 4, 5 and 6 illustrate examples of signalling according to the invention in different embodiments. Signalling is based on ETSI recommendation GSM 09.60 version 6.2.0, which is incorporated herein by reference.

FIG. 4 illustrates signalling related to PDP context activation. In the example of FIG. 4 the mobile station MS sends an 'Activate PDP Context' request to the serving support node SGSN in message 4-1. Having received the message the serving support node SGSN and the mobile station MS carry out security functions in message 4-2. After the security functions have been performed, the serving support node SGSN sends a 'Create PDP Context' request to the gateway support node GGSN1 in message 4-3. Messages 4-1, 4-2 and 4-3 are in accordance with the prior art. Having received message 4-3 the gateway support node GGSN1 checks in step 4-4 whether the conditions (or condition) for acceptance are fulfilled. If necessary, the limit value related to the condition or the condition is retrieved from a database. This is not, however, shown in FIG. 4. Examples of the conditions are given in connection with FIG. 2. In the example of FIG. 4 it is assumed that the GGSN1 cannot accept the PDP context request. Thus it requests the address of a more suitable GGSN from the database DB in message 4-5. The message may contain information on the condition which caused rejection and the cause of rejection. The message may also contain all parameters and attributes transmitted in message 4-3. The database retrieves the address GGSN2 on the basis of the information given in message 4-5 and sends it back in message 4-6. Messages 4-5 and 4-6 are not actual signalling messages. Messages 4-5 and 4-6 are used for indicating the database search performed in this step. Having received message 4-6 the gateway support node GGSN1 sends a 'Create PDP Context' response the cause parameter of which differs from the 'request accepted value' to the serving support node SGSN in message 4-7. The message also contains the address of the GGSN2. The serving support node SGSN separates the address from message 4-7 in step 4-8 and sends a 'Create PDP Context' request to the gateway support node GGSN2 in message 4-9. Message 4-9 is in accordance with the prior art. Having received message 4-9 the gateway support node GGSN2 checks in step 4-10 whether the conditions (or condition) for acceptance are fulfilled. In this case the conditions (or condition) are fulfilled and the gateway support node GGSN2 sends a 'Create PDP Context' response the cause parameter of which is 'request accepted' to the serving support node SGSN in message 4-11. In other words, message 4-11 is a positive response. The serving support node SGSN transmits the acceptance to the mobile station MS according to the prior art by sending an 'Active PDP Context' accept in message 4-12. After this the PDP context is activated from the mobile station, which can send and receive packets.

The PDP context activation illustrated in FIG. 4 can be performed when the mobile station attaches to the GPRS network. Alternatively, the user may activate the context or activation may be performed in response to a PDP context activation request received from the GPRS network.

FIG. 5 is a signalling chart illustrating a situation in which a tunnel has been established between the SGSN and the GGSN2. In other words, the PDP contexts are active. In step 5-1 the operating conditions of the gateway support node change. For example, the operator drives the gateway support node down or the load of the gateway support node exceeds the limit value because the limit value has been changed. Change of the operating conditions may also be an update of the PDP context received from the serving support node e.g. as the desired quality of service or the serving support node changes. Thus one end of the tunnel is to be transferred from the GGSN2 to another gateway support node. As a result of this, the gateway support node sends message 5-2 to the serving support node SGSN. Depending on the embodiment, the message may be a 'Create PDP Context' response the cause parameter value of which differs from the 'request accepted' value, a 'Delete PDP Context' or a 'Resent PDP Context'. Regardless of the type of the message it always contains the address of a new, more suitable gateway support node GGSN3 which is either obtained from the operator or retrieved from the database. Having sent the message the GGSN 2 deletes the PDP context in step 5-3, i.e. removes the tunnel. Having received message 5-2 the serving support node SGSN removes the tunnel to the GGSN2 in step 5-4, separates the address from message 5-2 and sends a 'Create PDP Context' request to the gateway support node GGSN3 in message 5-5. Having received message 5-5 the gateway support node GGSN3 checks in step 5-6 whether the conditions (or condition) for acceptance are fulfilled. This time the conditions (or condition) are fulfilled and the gateway support node GGSN3 sends a 'Create PDP Context' response the cause parameter of which is 'request accepted' to the serving support node SGSN in message 5-7. Thereafter the SGSN establishes a new tunnel and continues transmission of packets using this new tunnel. The mobile station does not need to be informed of the new tunnel.

If the conditions are not fulfilled in step 5-6, the gateway support node proposes another gateway support node. If no suitable gateway support node is found, a failure will occur and packets can no longer be transmitted.

FIG. 6 illustrates a signalling chart of a situation in which a tunnel has been established between the SGSN and the GGSN2. In other words, the PDP contexts have been activated. In step 6-1 the operating conditions change. For example, the load of the gateway support node exceeds the limit value because the limit value has been changed. As a result, the gateway support node sends message 6-2 to the serving support node SGSN. Preferably the message is 'Reset PDP Context'. Message 6-2 contains the address GGSN3 of a new, more suitable gateway support node which is either obtained from the operator or retrieved from the database. Having received message 6-2 the serving support node separates the address from message 6-2 in step 6-3 and sends a 'Create PDP Context' request to the gateway support node GGSN3 in step 6-4. Having received message 6-4 the gateway support node GGSN3 checks in step 6-5 whether the conditions (or condition) for acceptance are fulfilled. This time the conditions (or condition) are fulfilled and the gateway support node GGSN3 sends a 'Create PDP Context' response the cause parameter of which is 'request accepted' to the serving support node SGSN in message 6-6. Having received the positive response in message 6-6 the SGSN removes the tunnel to the GGSN2 in step 6-7 by sending a positive acknowledgement (ResetPDPContextAck) to the GGSN2. In step 6-8 the SGSN creates a new tunnel with the GGSN3 and continues transmission of packets using this new tunnel. The mobile station does not need to be informed of the new tunnel. When the GGSN2 receives a positive acknowledgement, it deletes the PDP context in step 6-9.

If the conditions are not fulfilled in step 6-5, the gateway support node GGSN3 sends a negative response (e.g. message 4-7 of FIG. 4), and the SGSN may try to establish a tunnel with the gateway Support node suggested by the GGSN3. If the SGSN received the negative response without a new gateway support node address, it will send a negative acknowledgement to the GGSN2 and will not remove the tunnel with it. In that case the GGSN2 searches for another PDP context which it tries to transfer to another gateway support node to divide the load evenly. Alternatively, having received the negative response from the GGSN3 the SGSN can always send a negative acknowledgement to the GGSN2, which may also search for a new gateway support node address to be sent to the SGSN.

A preferred embodiment of the invention utilizes each of the signalling types illustrated in FIGS. 4, 5 and 6. Depending on the change of operating conditions detected in the gateway support node either signalling 5 or signalling 6 is selected e.g. according to the instructions given by the operator. The instructions may be included in the condition. Signalling 5 is selected when the operator drives the gateway support node down, for example, whereas signalling 6 is selected in connection with the update of the PDP context. In this embodiment messages 5-2 and 6-2 must differ from each other so that the serving support node knows which signalling is concerned. The simplest way to distinguish one message from the other is to use messages with different names.

In preferred embodiments of the invention it is possible to use only one or two of the examples illustrated in FIGS. 4, 5, 6.

The steps and signalling messages shown in FIGS. 4, 5 and 6 are not in absolute chronological order and some of the steps may be performed simultaneously or in a different order. The signalling messages are only exemplary and may even comprise several separate messages for transmitting the same information. In addition, the messages may contain other information. The messages can also be combined freely or divided into several parts. Furthermore, the names of the messages may differ from the above-mentioned ones. It is essential that the gateway support node is capable of sending control information to the serving support node when another gateway support node is more suitable than the current gateway support node. Depending on the network structure, other network elements between which different functionalities have been divided may participate in data transmission and signalling.

Even though in connection with FIGS. 4, 5 and 6 only ordinary PDP contexts have been used as examples, the same functionality of the invention is also applicable to PDP contexts of an anonymous user (anonymous access).

It will be obvious to a person skilled in the art that as technology develops, the inventive concept can be implemented in various ways. Thus the invention and its embodiments are not limited to the examples described above but may vary within the scope of the claims.

What is claimed is:

1. A method, comprising:
defining at least one condition for a first gateway support node, so that when the condition is fulfilled, a second gateway support node is more suitable for transmitting packets over a connection, the second gateway support node being an alternative to the first gateway support node so that the packets are transmitted from a subscriber either via the first gateway support node or via the second gateway support node, the condition not relating to a receiver of a packet;
detecting, by the first gateway node that the condition is fulfilled;
instructing, by the first gateway node, to select the second gateway support node by sending a first message indicating the second gateway support node;
receiving in the first gateway support node a second message which indicates that a tunnel for transmitting packets between a subscriber and an external data network is to be established between a serving support node and the first gateway support node,
checking said condition, and
transmitting the first message to the serving support node if said condition is fulfilled, or
establishing a tunnel if said condition is not fulfilled.

2. The method according to claim 1, wherein if the tunnel is established between the serving support node and the first gateway support node, the method further comprises:
detecting a change in operating conditions in the first gateway support node,
checking said condition, and
transmitting a third message indicating said second gateway support node to the serving support node and removing the tunnel in the first gateway support node if said condition is fulfilled.

3. The method according to claim 2, wherein the system is a general packet radio service system and said first and third messages are response messages to a 'Create packet data protocol Context' request.

4. The method according to claim 1, wherein if the tunnel is established between the serving support node and the first gateway support node, the method further comprises:
detecting a change in operating conditions in the first gateway support node,
checking said at least one condition for the first gateway support node, and
performing, if said condition is fulfilled:
transmitting a fourth message indicating said second gateway support node to the serving support node,
waiting for an acknowledgement to said fourth message,
receiving the acknowledgement, and
removing the tunnel in the first gateway support node in response to a positive acknowledgement.

5. The method according to claim 4, wherein the system is a general packet radio service system and said first and fourth messages are response messages to a 'Create packet data protocol Context' request.

6. A method, comprising:
defining at least one condition for a first gateway support node, so that when the condition is fulfilled, a second gateway support node is more suitable for transmitting packets over a connection, the second gateway support node being an alternative to the first gateway support node so that the packets are transmitted from a subscriber either via the first gateway support node or via the second gateway support node, the condition not relating to a receiver of a packet;
detecting, by the first gateway node that the condition is fulfilled;
instructing, by the first gateway node, to select the second gateway support node by sending a first message indicating the second gateway support node;
establishing a tunnel between a serving support node and the first gateway support node;
detecting a change in operating conditions in the first gateway support node;
checking said at least one condition for the first gateway support node; and
transmitting a first message to the serving support node if said condition is fulfilled, said first message indicating that the tunnel should be removed to said second gateway support node.

7. The method according to claim 6, wherein if fulfillment of said at least one condition for the first gateway support node is detected, removing the tunnel in the first gateway support node in response to the transmission of said first message.

8. The method according to claim 6, wherein if fulfillment of the condition is detected,
waiting for an acknowledgement to the first message,
receiving the acknowledgement, and
removing the tunnel in response to a positive acknowledgement.

9. A packet-switched telecommunications system, comprising
a support node serving a subscriber of the telecommunications system,
a first and a second gateway support node, wherein
the support node is arranged to activate establishment of a tunnel, to be used for transmission of packets, originating from the subscriber, between the support node and the first gateway support node,
in response to fulfillment of a predefined condition, the predefined condition not relating to a receiver of a packet, the first gateway support node is arranged to send to the serving support node a first message indicating the second gateway support node which is more suitable for transmitting packets,
in response to receiving the first message, the serving support node is arranged to activate establishment of a tunnel to be used in transmission of packets with the second gateway support node indicated, and
packets transmitted using the tunnel between the support node and the first gateway support node are not sent from the first gateway support node to the second gateway support node.

10. The telecommunications system according to claim 9, wherein
the telecommunications system comprises a database where information on the second gateway support nodes defined for the first gateway support node is maintained, and
the first gateway support node is arranged to retrieve the most suitable second gateway support node from the database when the predefined condition is fulfilled.

11. The telecommunications system according to claim 9 wherein the first gateway support node is arranged to check at least one predefined condition in response to receiving a message requesting establishment of the tunnel from the serving support node.

12. The telecommunications system according to claim 9, wherein
the telecommunications system comprises the tunnel used for transmitting packets between the serving support node and the first gateway support node, and
the first gateway support node is arranged to detect a change in operating conditions and check at least one of said predefined conditions in response to detecting the change.

* * * * *